United States Patent
Chang et al.

(10) Patent No.: US 11,574,323 B2
(45) Date of Patent: Feb. 7, 2023

(54) METHODS AND SYSTEMS FOR PROCESSING MARKET DATA

(71) Applicant: XIGNITE, INC., San Mateo, CA (US)

(72) Inventors: Albert Shih-Po Chang, Palo Alto, CA (US); Vijay Choudhary, Foster City, CA (US); Pooya Soleimany Nezhadian, San Mateo, CA (US); Qin Yu, Santa Clara, CA (US)

(73) Assignee: XIGNITE, INC., San Mateo, CA (US)

( * ) Notice: Subject to any disclaimer, the term of this patent is extended or adjusted under 35 U.S.C. 154(b) by 0 days.

(21) Appl. No.: 16/776,853

(22) Filed: Jan. 30, 2020

(65) Prior Publication Data

US 2020/0242636 A1   Jul. 30, 2020

Related U.S. Application Data

(63) Continuation of application No. 15/370,982, filed on Dec. 6, 2016, now Pat. No. 10,592,912.

(51) Int. Cl.
*G06Q 30/02* (2012.01)
*H04L 9/40* (2022.01)

(52) U.S. Cl.
CPC ....... *G06Q 30/0201* (2013.01); *H04L 63/123* (2013.01)

(58) Field of Classification Search
None
See application file for complete search history.

(56) References Cited

U.S. PATENT DOCUMENTS

| | | |
|---|---|---|
| 7,783,615 B1 | 8/2010 | Compton |
| 7,801,784 B2 | 9/2010 | Bandman |
| 7,974,909 B1 * | 7/2011 | Tresenriter ............. G06Q 40/04 705/37 |
| 9,406,196 B2 | 8/2016 | Asher |
| 2002/0026321 A1 | 2/2002 | Faris et al. |
| 2002/0055899 A1 | 5/2002 | Williams |
| 2002/0091621 A1 | 7/2002 | Conklin |
| 2005/0256797 A1 | 11/2005 | Tyulyaev |
| 2007/0050273 A1 | 3/2007 | Burke |
| 2008/0086363 A1 * | 4/2008 | Kass ..................... G06Q 10/04 705/7.29 |
| 2009/0182683 A1 | 7/2009 | Taylor |
| 2012/0041891 A1 | 2/2012 | Babel |
| 2015/0348193 A1 | 12/2015 | Weber et al. |
| 2016/0335361 A1 | 11/2016 | Teodorescu et al. |
| 2016/0358264 A1 | 12/2016 | Brightman et al. |

FOREIGN PATENT DOCUMENTS

WO    WO-0241117    5/2002

OTHER PUBLICATIONS

U.S. Appl. No. 16/035,253, filed Jul. 13, 2018, Pending.
(Continued)

*Primary Examiner* — Craig C Dorais
(74) *Attorney, Agent, or Firm* — DLA Piper LLP (US)

(57) ABSTRACT

Methods and systems for processing financial market data. An electronic communication to be taken in response to detecting a market condition can be defined. Market data can be received. The market condition can be detected. An order to make a trade in a market based on the market condition can be accepted.

57 Claims, 19 Drawing Sheets

(56) References Cited

OTHER PUBLICATIONS

The UTP Plan Trade Data Feed (UTDF) Direct Subscriber Interface Specification, Version 14.4, NASDAQ Market Technology, Printed from www.utpplan.com/DOC/utdfspecification.pdf, 96 Pages, (Nov. 2015).
US Equities/Options Multicast PITCH Specification, Version 2.20.4, Bats Global Markets, Inc., Printed from www.batstrading.com/resources/.../BATS_MC_PITCH_Specification.pdf, 68 Pages, (Jan. 29, 2014).
US Equities TOP Specification, Version 1.3.0, CBOE, Printed from cdn.batstrading.com/resources/membership/BATS_TOP_Specification.pdf, 22 Pages, (Feb. 19, 2016).
U.S. Appl. No. 16/035,253.
U.S. Appl. No. 16/035,253, filed Jul. 13, 2018, U.S. Pat. No. 11,164,255.
U.S. Appl. No. 16/544,254, filed Aug. 19, 2019, Pending.
U.S. Appl. No. 15/370,982, filed Dec. 6, 2016, U.S. Pat. No. 10,592,912.
U.S. Appl. No. 17/466,244.
U.S. Appl. No. 16/544,254.

\* cited by examiner

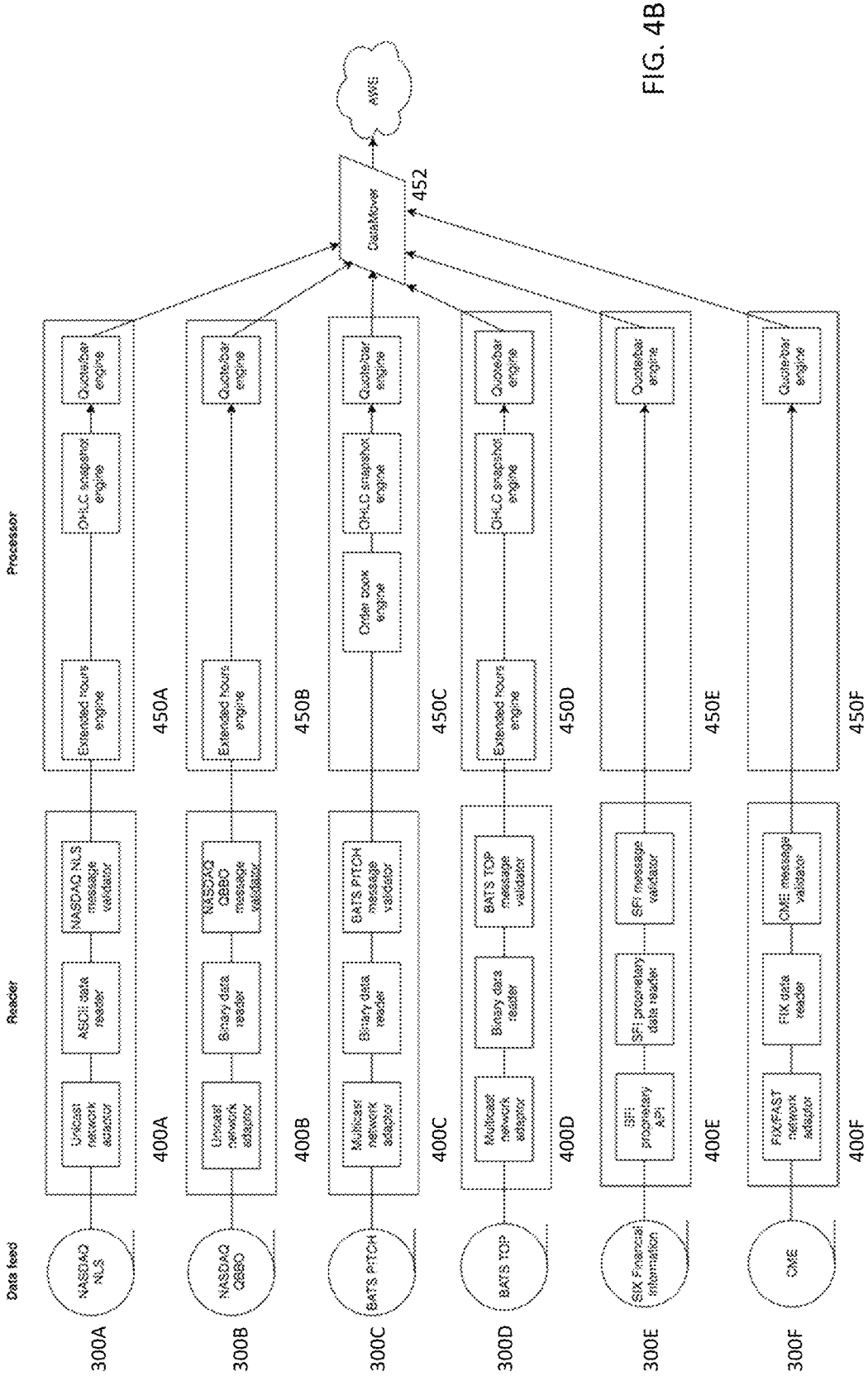

| BATS PITCH | NASDAQ NLS |
|---|---|
| Reader | |
| | Load last checkpoint from Processor to determine the last NLS packet received. |
| Establish multicast connection to BATS feed server. | Establish unicast TCP connections to NASDAQ NLS feed server. |
| Login to BATS feed server. | Login to NASDAQ NLS feed server, which requires as part of the login the sequence number of the last NLS packet. |
| Read BATS packets from a BATS multicast channel. | Read NASDAQ NLS packets from the unicast TCP connection. |
| Detect excessively large gap at start-up and request packets to fill that gap. | |
| Detect gaps of missing packets and request packets within those gaps. | |
| Decode binary packets. | Decode binary packets. |
| Generate PITCH messages from binary packets. | Generate NLS messages from binary packets. |
| Create complete, sequential PITCH messages by eliminating duplicate messages, retrieving missing messages and correcting out-of-order messages. | Create complete, sequential NLS messages by eliminating duplicate messages, retrieving missing messages, and correcting out-of-order messages. |
| Add PITCH messages to queue in sequential order. | Add NLS messages to queue in sequential order. |
| On a separate, asynchronous thread, send PITCH messages to Processor. | On a separate, asynchronous thread, send NLS messages to Processor. |

FIG. 4C

| BATS PITCH | NASDAQ NLS |
|---|---|
| Store PITCH messages from excessively large gaps at startup | |
| Update statistics and process each message based on message type. | Update statistics and process each message based on message type |
| Create order book | |
| Create raw ticks by matching bids and asks. | Create raw ticks by interpreting trade messages. |
| Set Open, High, Low, Close following BATS specifications. | Set Open, High, Low, Close following NLS specifications. |
| Create 1-second bars from raw ticks | Create 1-second bars from raw ticks |
| Create checkpoint periodically to return to in the event of an error processing the feed | Create checkpoint periodically to return to in the event of an error processing the feed |
| In the event of an error, re-load the most recent checkpoint. | In the event of an error, re-load the most recent checkpoint. |
| Prepare quote and bar messages to send to DataMover to route to a cache | Prepare quote and bar messages to send to DataMover to route to a cache. |

FIG. 4D

| Modifier | Condition | Consolidated Processing Guidelines | | | | Market Center Processing Guidelines | | | |
|---|---|---|---|---|---|---|---|---|---|
| | | Update High/Low | Update Last | Update High/Low | Update Last | Update High/Low | Update Last | Update Last | Update volume |
| @ | Regular Sale | Yes | Yes | Yes | Yes | Yes | Yes | | Yes |
| A | Acquisition | Yes | Yes | Yes | Yes | Yes | Yes | | Yes |
| B | Bunched Trade | Yes | Yes | Yes | Yes | Yes | Yes | | Yes |
| C | Cash Sale | No | No | No | No | No | No | | Yes |
| D | Distribution | TBD | TBD | TBD | TBD | TBD | TBD | | TBD |
| E | Placeholder Future Use | TBD | TBD | TBD | TBD | TBD | TBD | | TBD |
| F | Intermarket Sweep | Yes | Yes | Yes | Yes | Yes | Yes | | Yes |
| G | Bunched Sold Trade | Yes | No | Yes | No | Yes | No | | Yes |
| H | Odd Lot Trade | No | No | No | No | No | No | | Yes |
| I | Price Variation Trade | No | No | No | No | No | No | | Yes |
| K | Rule 155 Trade (AMEX) | Yes | Yes | Yes | Yes | Yes | Yes | | Yes |
| L | Sold Last | No | Yes | No | Yes | No | Yes | | Yes |
| M | Market Center Official Close | No | No | No | No | No | Yes | | No |
| N | Next Day | Yes | No | Yes | No | Yes | No | | Yes |
| O | Opening Prints | Yes | Yes | Yes | Yes | Yes | Yes | | Yes |
| P | Prior Reference Price | Yes | No | Yes | No | Yes | No | | Yes |
| Q | Market Center Official Open | No | No | No | No | No | No | | No |
| R | Seller | No | No | No | No | No | No | | Yes |
| S | Split Trade | No | Yes | No | Yes | No | Yes | | Yes |
| T | Form T | Yes | Yes | No | No | No | No | | Yes |
| U | Extended trading hours (Sold Out of Sequence) | No | No | No | No | No | No | | Yes |
| V | Contingent Trade | No | No | No | No | No | No | | Yes |
| W | Average Price Trade | No | No | No | No | No | No | | Yes |
| X | Cross Trade | Yes | Yes | Yes | Yes | Yes | Yes | | Yes |
| Y | Yellow Flag Regular Trade | Yes | Yes | Yes | Yes | Yes | Yes | | Yes |
| Z | Sold (out of Sequence) | Yes | No | Yes | No | Yes | No | | Yes |
| 1 | Stopped Stock (Regular Trade) | Yes | Yes | Yes | Yes | Yes | Yes | | Yes |
| 4 | Derivatively priced | Yes | No | Yes | No | Yes | No | | Yes |
| 5 | Re-Opening | Yes | Yes | Yes | Yes | Yes | Yes | | Yes |
| 6 | Closing Prints | Yes | Yes | Yes | Yes | Yes | Yes | | Yes |
| 7 | Qualified Contingent Trade ("QCT") | No | No | No | No | No | No | | Yes |
| 8 | Placeholder For 611 Exempt | TBD | TBD | TBD | TBD | TBD | TBD | | TBD |
| 9 | Corrected Consolidated Close (per listing market) | Yes | Yes | No | No | No | No | | No |

FIG. 4E

| AlertID | Customer | Symbol | Real-time/Delayed | Condition | Action | Routed to... | Because... |
|---|---|---|---|---|---|---|---|
| 100 | 1 | AAPL | Real-time | %Change>=5% | Write call | US real-time A-M Copy 3 | There are 3 copies that CloudAlerts round-robin distributes alert conditions for evaluation, and Copy 3 is the next shard in the round-robin. |
| 101 | 1 | AAPL | Real-time | %Change<=-5% | Buy put | US real-time A-M Copy 1 | Copy 1 is the next shard in the round-robin. Note that AlertID 101 is for the same customer and symbol as AlertID 100. Alerts for the same customer and even same symbol may be split across shards as there is no performance efficiency to be gained by grouping alerts by customer. |
| 110 | 1 | FB | Real-time | Volume>=25M | Email alert | US real-time A-M Copy 2 | Copy 2 is the next shard in the round-robin. Copy 3 is under-utilized, so alerts are routed to Copy 3 until all three shards are balanced. Copy 3 may be significantly underutilized compared to other shards for reasons including: <br>- We define a threshold of 50 alerts/shard, and after Copy 1 and Copy 2 have attained that threshold, we created a new Copy 3 shard. All new alerts will be assigned to Copy 3 until the shards are balanced. <br>- All three shards were balanced, but some alerts assigned to Copy 3 either expired or were inactivated, leaving fewer active alerts assigned to Copy 3. |
| 120 | 1 | TWTR | Real-time | High>=$22 | Sell order | US real-time N-Z Copy 3 | Copy 3 is under-utilized, so alerts are routed to Copy 3 until all three shards are balanced. |
| 121 | 1 | TWTR | Real-time | Low<=$15 | Email alert | US real-time N-Z Copy 3 | |
| 200 | 2 | BAC | Real-time | High>=$22 | Email alert | US real-time A-M Copy 3 | Copy 3 is the next shard in the round-robin. |
| 201 | 2 | BAC | Real-time | Low<=$15 | Email alert | US real-time A-M Copy 1 | Copy 1 is the next shard in the round-robin. |
| 210 | 2 | C | Real-time | High>=$60 | Email alert | US real-time A-M Copy 2 | Copy 2 is the next shard in the round-robin. |
| 211 | 2 | C | Real-time | Low<=$50 | Email alert | US real-time A-M Copy 3 | Copy 3 is the next shard in the round-robin. |
| 300 | 3 | AEP | Delayed | %Change<=-5% | Email alert | US delayed A-M | |
| 310 | 3 | PM | Delayed | %Change<=-5% | Email alert | US delayed N-Z | |

FIG. 13

METHODS AND SYSTEMS FOR PROCESSING MARKET DATA

CROSS-REFERENCE TO RELATED APPLICATIONS

The present application claims priority to U.S. application Ser. No. 15/370,982, filed on Dec. 6, 2016, titled "EXCEPTION PROCESSING SYSTEMS AND METHODS." This application is herein incorporated by reference in its entirety for all purposes.

BRIEF DESCRIPTION OF THE DRAWINGS

FIG. 4B is a data feed ingestion processing system according to an embodiment of the invention.

FIG. 4C is a comparison between data feed reader processes according to an embodiment of the invention.

FIG. 4D is a comparison between data feed parser processes according to an embodiment of the invention.

FIG. 4E is a trade condition matrix.

FIG. 13 is a set of alert definitions according to an embodiment of the invention.

DETAILED DESCRIPTION OF SEVERAL EMBODIMENTS

Figure 1:
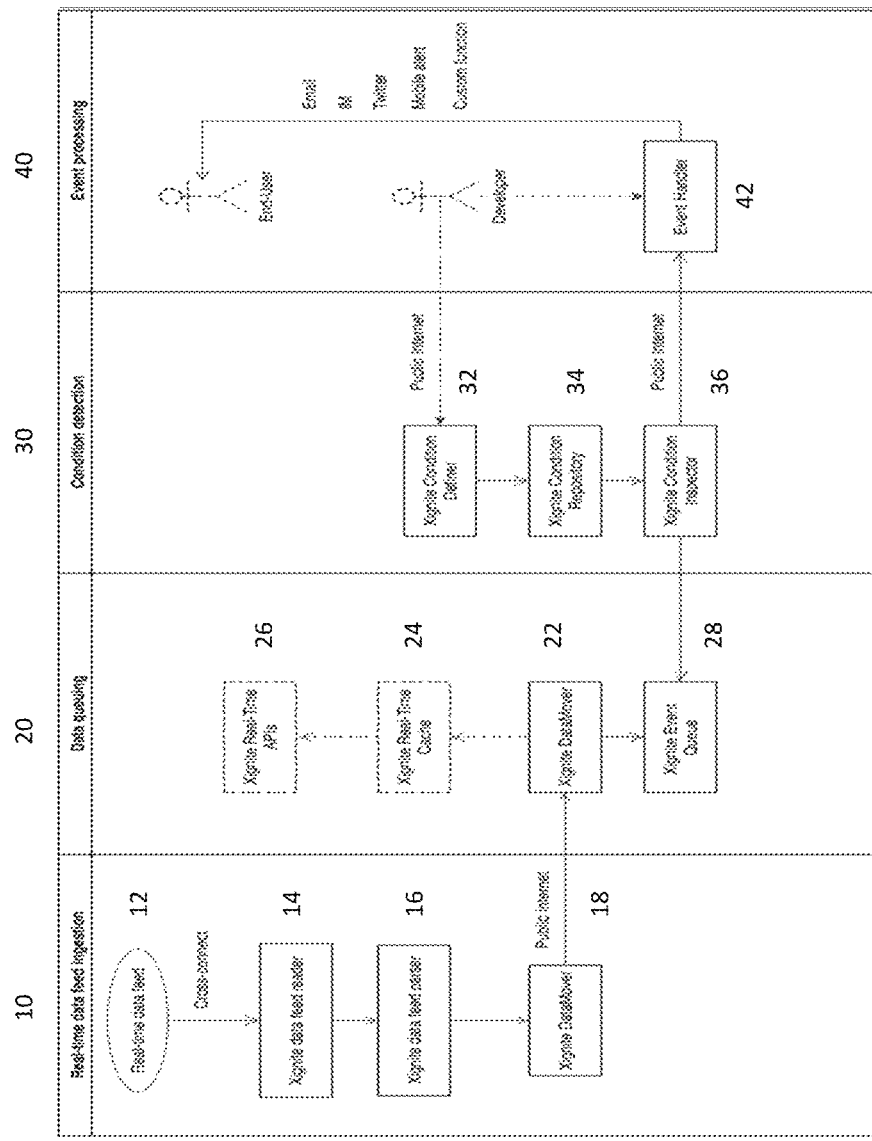
FIG. 1 is an event processing workflow according to an embodiment of the invention.

Systems and methods described herein may perform real-time exception processing of events. Example embodiments may comprise one or more of a method, system, and/or software configured for ingesting, parsing, storing, sorting, searching, filtering, calculating, summarizing, categorizing, correlating, evaluating and displaying real-time changes in data to expedite the recognition, response, and processing of these events.

For example, exception processing of financial market events is described herein, but other events may be processed by the systems and methods described herein. In some embodiments, machine-readable financial market data may be evaluated in real time against customer-definable conditions during data ingestion and prior to reformatting to human readable format to minimize exception processing latency. A public cloud infrastructure may enable horizontal capability to extend to support both additional financial market data and additional customer-definable conditions.

Alerts

The systems and methods described herein may generate alerts in response to events. In some embodiments, alerts may comprise one or more of the attributes shown in Table 1.

TABLE 1

Alert Attribute Examples

| Attribute | Description | Example |
| --- | --- | --- |
| Security identifier | A unique identifier for a security whose market data is to be monitored, such as a trading symbol, CUSIP, ISIN, SEDOL, or Valoren. | IBM ® 6502.XTKS |
| System API | An API that contains the market data to be monitored. | GlobalRealTime GlobalQuotes |
| Condition | The market data condition that triggers the action of interest. The condition can refer to field names in the system API. | Last > High52Weeks Volume > 1,000,000 |
| Action | The action to take when the market data condition is met, such as email, SMS, or a callback URL webhook. | SMS |
| When active | When to monitor for the condition, including start date, end date, and whether to disable monitoring after the condition has been met. | StartDate = 1/1/2016 |

The system may enforce exchange and vendor agreements through entitlements that can grant or revoke access by customer to specific system Apia, as well as specific underlying data within a system API. For example, a customer may have access to real-time NYSE quotes and delayed XLON quotes, which the system may represent with entitlements to both GlobalRealTime and GlobalQuotes APIs, but for the NYSE exchange only in GlobalRealTime and for the XLON quotes only in GlobalQuotes.

The system may leverage these entitlements, allowing a customer to create an alert only against APIs that that customer has the proper entitlements to access. In the prior example, the customer could create an alert against real-time IBM® prices (as IBM® is listed on NYSE) but not against real-time MSFT prices (as MSFT is listed on NASDAQ). Similarly, the customer could create an alert against delayed BP prices (as BP is listed on XLON) but not against BP real-time prices (since the customer has entitlements for delayed but not real-time XLON data).

An alert condition may contain user-specified fields from the system API. For example, GlobalQuots may include fields such as Open, High, Low, Last, Close, Volume, High52Week, and PercentChangeFromPreviousClose. A user may define conditions that compare a field to a specific value, or to another field. For example:

Volume>1,000,000
PercentChangeFromPreviousClose>5%
Last>High52Week

The systems and methods described herein may automatically respond to events, not only by sending alerts, but also by performing specified actions. What a customer may want to do in response to a financial market condition can vary widely from customer to customer. The range of actions may be as simple as sending an email or text message to invoking a proprietary customer function. The system may support maximum flexibility by allowing a customer to define and specify the URL for a web service as part of an action definition. When the system detects a condition, it may trigger the corresponding web service by calling the URL using an HTTP GET command.

For example, a customer that wants to execute a sell order through the system may define a web service that creates a sell order in that customer's proprietary system, then exposes that web service through a publicly accessible URL. The web service may be written in any language, as long as the system can trigger that web service by calling the URL using an HTTP GET command. Because HTTP GET commands are used by many browsers such as Chrome or Internet Explorer to navigate to the URL of a website, HTTP GET commands may be fairly simple to test. For example, the system may verify a customer web service using a browser or a programming language that can perform an HTTP GET command.

In one example order, a web service URL to execute a buy order for 100 shares of MSFT may read as follows:
https://www.mybroker.com/trading/
buy.json?Symbol=MSFT&Quantity=100
where the query string parameters Symbol and Quantity denote the security and the number of shares to sell.

A user may define the condition for selling 100 shares of MSFT and provide the web service URL. When the system detects that the specified condition has been met, it may invoke the web service by issuing an HTTP GET command with this URL.

The system may support 2-way SSL authentication and/or other security protocols for customers who want to validate that the system is the entity invoking the URL.

The system may provide additional contextual information regarding a triggered alert. For example, the additional contextual information may be communicated through substitution variables that can be embedded within a URL, such as the following examples in Table 2:

TABLE 2

Substitution Variable Examples

| Substitution variable | Description | Example |
|---|---|---|
| AlertIdentifier | System-generated unique identifier for the alert. | 123456789 |
| IdentifierType | A symbology for the security identifier. | Symbol |
| Identifier | Security symbol for the alert. | MSFT |
| Condition | Logical condition for the alert. | Last >= High52Weeks |
| Timestamp | Date and/or time that the alert fired. | 2016-07-01 16:31:45 |

A user may embed any substitution variable within a web service URL by enclosing it within curly braces, for example. The system may substitute the corresponding values into the web service URL prior to invoking the URL through an HTTP GET command.

For example, a user can define the following web service URL:
https://www.mybroker.com/trading/
buy.json?Symbol={Identifier}&Quantity=100 and the system may substitute the trading symbol for {Identifier} before invoking it through an HTTP GET command as follows:
https://www.mybroker.com/trading/
buy.json?Symbol=MSFT&Quantity=100

With the substitution variables, a user may define a single web service URL and use it for several alerts. For example, a user can define separate alerts to sell different securities and use the same web service URL with the {Identifier} substitution parameter on each of the alerts.

A user may specify the start date and end date for monitoring the condition of each alert. A user may specify whether a triggering event disables the alert or whether to restart monitoring the condition starting with the next trading day, for example.

Technical Overview

FIG. 1 is an event processing workflow according to an embodiment of the invention. The workflow is divided into a data feed ingestion workflow 10, a data queuing workflow 20, a condition detection workflow 30, and an event processing workflow 40. Specific systems configured to perform these workflows and specific workflow embodiments are described in greater detail below. FIG. 1 summarizes the overall functioning of the exception processing systems and methods disclosed herein.

In summary, real-time market data may be pushed and made available to system APIs. For example, an exchange may publish trades, quotes, and other market data in real-time. A data feed handler physically co-located near the exchange with a high-bandwidth network connection may read and interpret data from the exchange. A data mover may bundle and transmit the data in real-time over the Internet or some other network to destinations on the public cloud. The data mover may deliver the data to alert event queues. The data mover may cache the data in in-memory cache servers to enable API front-end servers to retrieve the data.

Specifically, in the example data feed ingestion workflow 10, in 12 a real-time data feed may publish exchange data. In 14, the data feed handler may read the data from the data feed. In 16, a data feed parser may parse the read data. In 18, a data mover may bundle and transmit the data over the Internet.

In the example data queuing workflow 20, in 22 a data mover (e.g., a separate data mover located apart from the data feed handler) may receive parsed data. In 24, the data mover may cache the data in in-memory cache servers. In 26, the cached data may be processed by system APIs. In 28, the parsed data may be placed in an event queue.

In the example condition detection workflow 30, in 32 a condition definer may receive condition detection parameters, for example from a user. In 34, the parameters may be stored in a condition repository. In 36, a condition inspector may inspect the event queue for data indicating that the condition is met.

In the example event processing workflow 40, in 42 an event handler may respond to a condition being met, for example by notifying a user as shown in FIG. 1 or by taking some other action.

Figure 2:
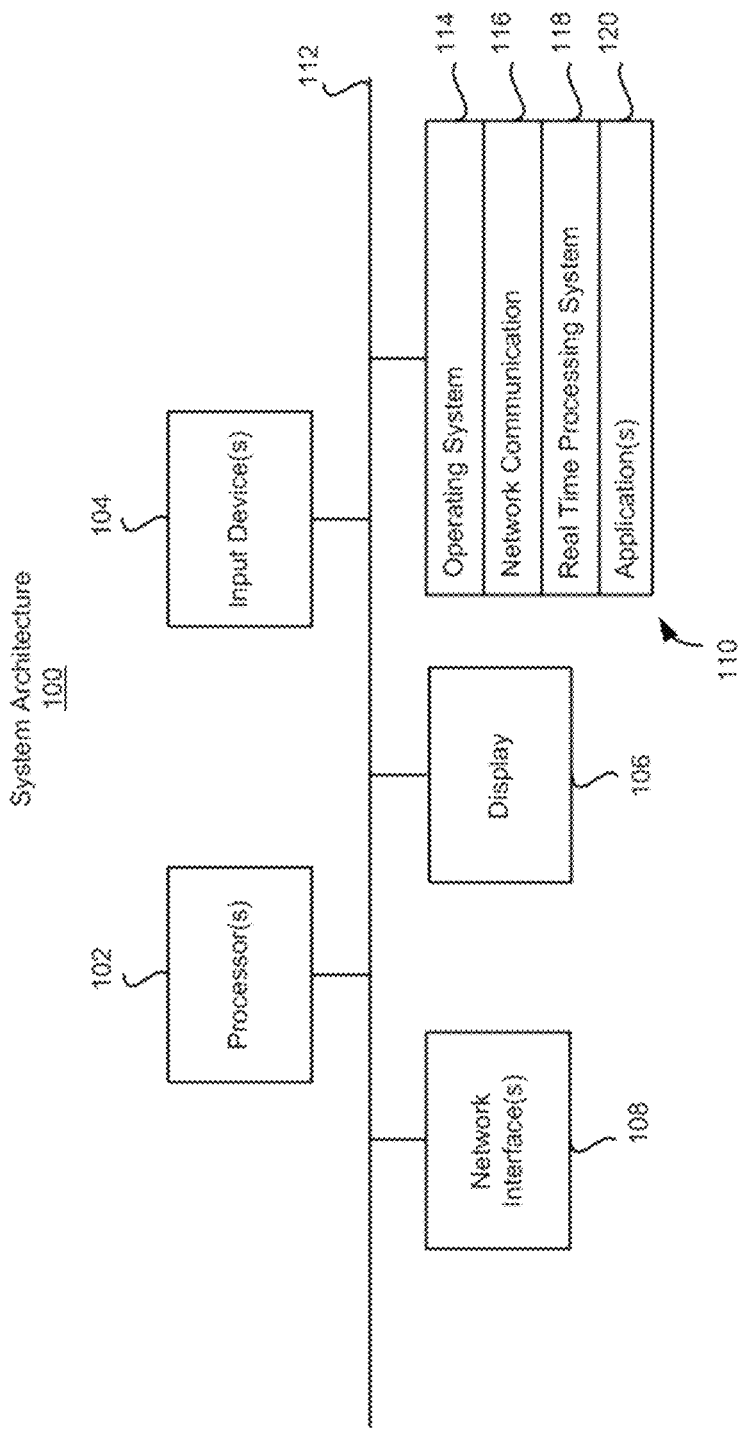
FIG. 2 is a system architecture according to an embodiment of the invention.

FIG. 2 is a block diagram of an example system architecture 100 implementing the features and processes described herein. The architecture 100 may be implemented on any electronic device that runs software applications derived from compiled instructions, including without limitation personal computers, servers, smart phones, media players, electronic tablets, game consoles, email devices, etc. In some implementations, the architecture 100 may include one or more processors 102, one or more input devices 104, one or more display devices 106, one or more network interfaces 108, and one or more computer-readable mediums 110. Each of these components may be coupled by bus 112.

Display device 106 may be any known display technology, including but not limited to display devices using Liquid Crystal Display (LCD) or Light Emitting Diode (LED) technology. Processor(s) 102 may use any known processor technology, including but not limited to graphics processors and multi-core processors. Input device 104 may be any known input device technology, including but not limited to a keyboard (including a virtual keyboard), mouse, track ball, and touch-sensitive pad or display. Bus 112 may be any known internal or external bus technology, including but not limited to ISA, EISA, PCI, PCI Express, NuBus, USB, Serial ATA or FireWire. Computer-readable medium 110 may be any medium that participates in providing instructions to processor(s) 102 for execution, including without limitation, non-volatile storage media (e.g., optical disks, magnetic disks, flash drives, etc.), or volatile media (e.g., SDRAM, ROM, etc.).

Computer-readable medium 110 may include various instructions 114 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 104; sending output to display device 106; keeping track of files and directories on computer-readable medium 110; controlling peripheral devices (e.g., disk drives, printers, etc.) which can be controlled directly or through an I/O controller; and managing traffic on bus 112. Network communications instructions 116 may establish and maintain network connections (e.g., software for implementing communication protocols, such as TCP/IP, HTTP, Ethernet, etc.).

A real time processing system 118 can include instructions that may process market data as described herein.

Application(s) 120 may be an application that uses or implements the processes described herein. The processes may also be implemented in operating system 114.

The described features may be implemented advantageously in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
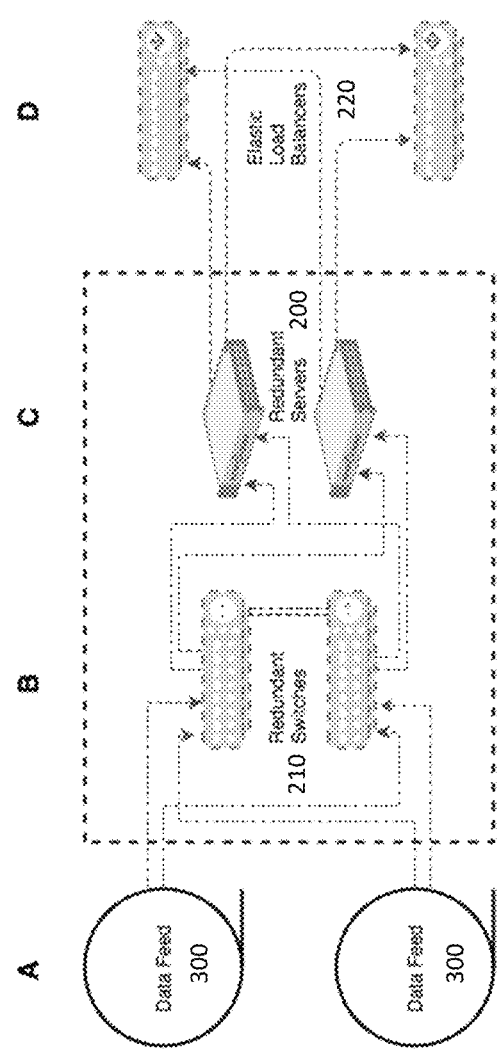
FIG. 3 is a hardware system according to an embodiment of the invention.

FIG. 3 is a hardware system according to an embodiment of the invention, illustrating how hardware elements may be arranged to provide speed and redundancy. Real-time data feed ingestion may be performed in physical co-locations that are located near financial market exchanges or data providers. Fully redundant networking and server hardware may be installed at co-locations to eliminate single points of failure. High-bandwidth network cross-connects may enable receiving financial market data feeds and processing the incoming data to transmit only data used to create alerts over the internet to the public cloud infrastructure, without transmitting unwanted or unnecessary data that is not used to create the alerts.

Data feeds 300 may be financial market data feeds from an exchange or other market data provider. As data feeds 300 may provide a great deal of data at high speeds, redundant servers 200 and redundant switches 210 may be physically located in a data center co-location with direct connectivity to these data feeds. Accordingly, the redundant servers 200 and redundant switches 210 may maintain high bandwidth connections with the data feeds 300. For example, high-bandwidth cross-connects from each data feed 300 may connect into the data center co-location housing redundant switches 210. Each switch 210 may have network connectivity to redundant data feed handler servers 200 also housed in the same co-location. Data feed handler servers 200 may include NIC-teamed interfaces to accept network transmissions from multiple data feeds 300. Data feed handler servers 200 may have internet connectivity to transmit market data to a public cloud infrastructure. Load balancers 220 in a public cloud infrastructure may receive and route market data to virtual server instances.

The redundant elements of FIG. 3 may provide full redundancy to prevent any single point of failure from causing a disruption of service. For example, multiple physical circuits may be provided for the same data feed 300. Each physical circuit may transmit data through separate network paths with no overlapping dependencies. Each data feed circuit may independent of any network disruption on the other data feed circuits. If a network disruption causes one data feed circuit to fail, the other data feed circuits may be unaffected and may continue to send market data.

Multiple switches 210 consuming data from each of the multiple data feed circuits may be provided. Switches 210 may be configured in a hot/hot automatic failover. One switch 210 may serve as the primary and may send data to redundant data feed handler servers 200. In the event of a hardware failure causing the primary switch 210 to become inoperable, a redundant switch 210 may transparently promote itself to be the primary and may continue sending data to the redundant data feed handler servers 200.

Multiple data feed handler servers 200 consuming data from each of the multiple data feed circuits may be provided. Each server 200 may configure NIC-teamed network interface cards to support consuming data from multiple switches 210 and transparently failover between data from each switch 210. Each data feed handler server 200 may send data to multiple elastic load balancers 220 in a public cloud infrastructure.

Multiple elastic load balancers 220 may be provided. Each elastic load balancer 220 may be deployed in a different geographic location from other elastic load balancers 220 for redundancy in the public cloud.

Data Ingestion

Figure 4A:
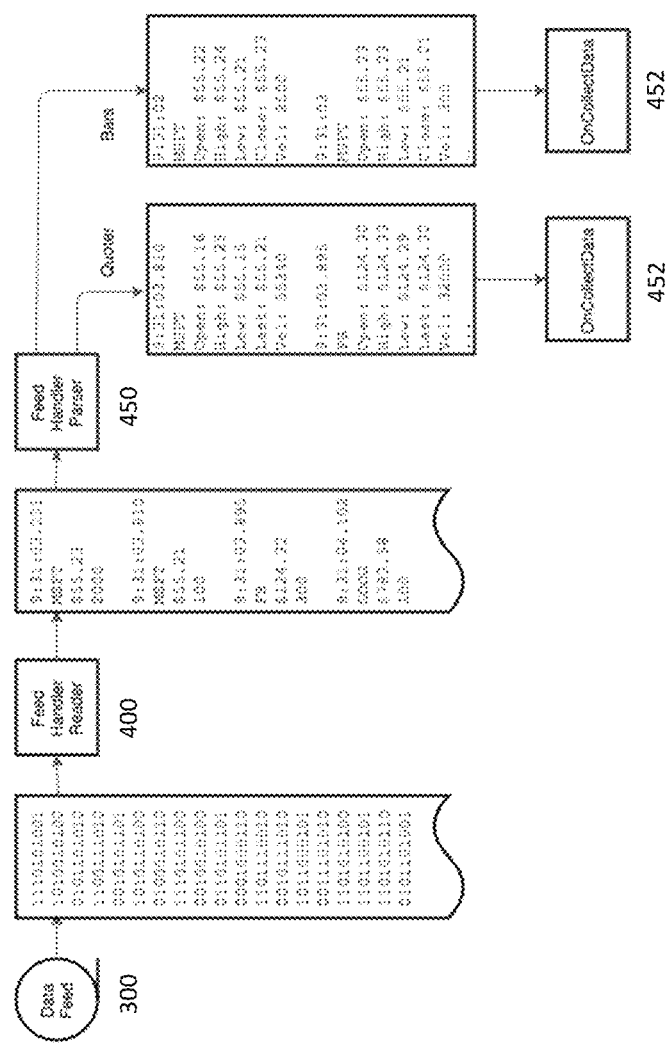
FIG. 4A is a data feed ingestion processing system according to an embodiment of the invention.
Figure 5:
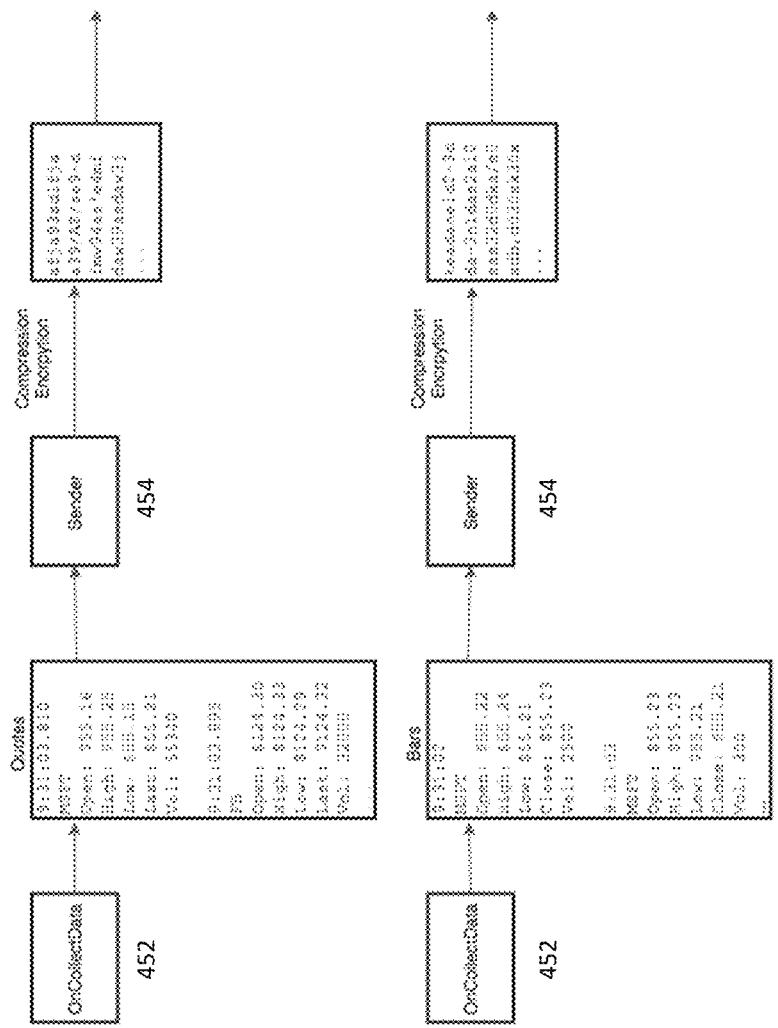
FIG. 5 is a data feed ingestion processing system according to an embodiment of the invention.
Figure 6:
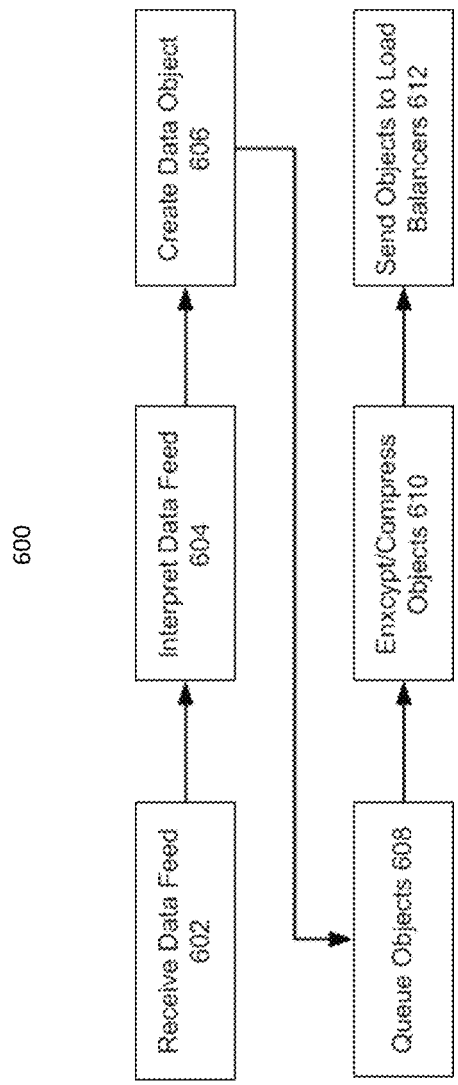
FIG. 6 is a data feed ingestion process according to an embodiment of the invention.

FIGS. 4A-5 show a data feed ingestion processing system according to an embodiment of the invention, and FIG. 6 shows a data feed ingestion process 600 according to an embodiment of the invention. Process 600 is explained in the context of the system of FIGS. 4A and 5 as follows.

In 602, data feed handlers may receive data from data feeds 300. Data feed handlers may comprise at least a reader 400 and a parser (which may also be referred to as a processor) 450. Data feed 300 providers may deliver data over various networking protocols, proprietary data messaging layers, and proprietary data representations. For example, as shown in FIG. 3, data feed 300 may deliver binary data. A primary switch 210 may send the data feed data to both primary and secondary data feed handlers. A secondary switch 210 may be on hot standby to do the same in the event the primary switch 210 fails. FIG. 4A shows a single data feed 300. FIG. 4B, discussed below, shows an example wherein multiple data feeds 300 with different data formats are processed.

In 604, reader 400 may interpret the data feed data. For example, as shown in FIG. 3, the binary data from data feed 300 may be converted into standardized data indicating a condition (e.g., market price for a stock). Reader 400 may be customized specifically to interpret a particular data feed 300 provider and its proprietary data messaging layer and data representation. Data feed formats may vary. For example, some may use XML, and others may use proprietary binary formats. Different data feeds may encode market data differently, for example providing the latest snapshots of some data elements in some cases or providing a sequence of trades that require the parser to calculate the latest snapshots in others. Accordingly, separate readers 400 may be provided if multiple data feeds 300 from various sources are received.

In 606, parser 450 may process the data to create data objects that may be evaluated to determine whether a condition is met. Example data objects in some embodiments may include quotes and bars, as shown in FIG. 3. In some embodiments, data objects may include market snapshots that include open, high, low, and last market price.

In 608, parser 450 may queue the objects for sending. Parser 450 may use data movers 452 to send data to the public cloud infrastructure. For example, parser 450 may register an OnCollectData callback function, which data mover 452 may invoke to retrieve data objects. Parser 450 may configure the frequency for data mover 452 to repeatedly call OnCollectData, for example, once per second. Data mover 452 may have a configuration to specify how frequently to invoke OnCollectData to retrieve data objects from parser 450, whether to enable encrypting data objects for greater security, whether to enable compressing data objects for lower network usage (but with higher CPU usage), and/or how frequently to send data objects to its destination, for example, once every 3 seconds. Data mover 452 may create a background thread that repeatedly invokes OnCollectData on the configured frequency. Data mover 452 may store the data objects in an in-memory queue.

In 610, parser 450 may optionally encrypt and/or compress the data objects, and in 612, parser 450 may send the (optionally encrypted and/or compressed) data objects to load balancers. Data mover 452 may create a separate background thread that repeatedly invokes its sender method on the configured frequency. The sender method may retrieve data objects from the in-memory queue, encrypt data objects if encryption is enabled in the data mover 452 configuration, compress data objects if compression is enabled in the data mover 452 configuration, and send data objects to their destination as specified in the data mover 452 configuration. Data mover 452 may send data over the internet via TCP/IP to multiple geographic regions within a public cloud infrastructure. Each geographic region exposes an elastic load balancer, which may be a static address bound to virtual devices for transparently providing redundancy.

FIG. 4B is a data feed ingestion processing system according to an embodiment of the invention. FIG. 4B shows an example wherein multiple data feeds 300A-300F are processed. Each data feed 300A-300F in this example is from a different source (e.g., NASDAQ NLS, BATS PITCH, etc.). Different sources may publish data in different formats. For examples of specifications for data published by data feeds 300, see UTDF Direct Subscriber Interface Specification, version 14.4, NASDAQ Market Technology, November 2015 (www.utpplan.com/DOC/utdfspecification.pdf); BATS PITCH Specification, version 2.20.4, Bats Global Markets, January 2014 (www.batstrading.com/resources/ . . . /BATS_MC_PITCH_Specification.pdf); and US Equities TOP Specification, version 1.3.0, Bats Global Markets, February 2016 (cdn.batstrading.com/resources/membership/BATS_TOP_Specification.pdf); the entirety of each of which is incorporated by reference herein. These references are presented as examples of data feed 300 outputs to illustrate the complexity and importance of customizing readers 400 and parsers 450 to suit their associated data feeds 300. However, the systems and methods described herein are not limited to processing data feeds 300 using the formats described by these references.

Corresponding readers 400A-400F for each data feed 300A-300F may be customized to process the specific feed they are configured to read. For example, in the embodiment of FIG. 4B, each reader 400A-400F may have a network adaptor or API specific to the connection used by the corresponding data feed 300A-300F. NASDAQ readers 400A-400B may have unicast network adaptor, BATS readers 400C-400D may have multicast network adaptor, SIX reader 400E may have a proprietary API, CME reader 400F may have a FIX/FAST network adaptor, etc. Likewise, each reader 400A-400F may have a data reader specific to the data type used by the corresponding data feed 300A-300F. Depending on data type, readers 400A-400F may include ASCII data readers, binary data readers, FIX data readers, proprietary data readers, etc. Each reader 400A-400F may include a message validator specific to the data type used by the corresponding data feed 300A-300F. Once the data is read, validators may extract the messages from the data. Each reader 400A-400F may include a validator tailored to the messages in the corresponding data feed 300A-300F. In other embodiments, different combinations of reader components and/or different reader components not shown may be included in one or more readers 400 to handle data from various data feeds 300 as required.

Each parser 450A-450F may be similarly customized to process the specific message types output by each corresponding reader 400A-400F. For example, depending on message format, some parsers 450A, 450B, 450D may require extended hours engines to convert time data into a standard format. Some parsers 450C may require an order book engine to create order book data from the messages if they do not include order book data. Some parsers 450A, 450C, 450D may include an open-high-low-close (OHLC) snapshot engine to parse the messages into open-high-low-close format if they are not already in that format. Finally, each parser 450A-450F may include a quote/bar engine configured to normalize the format of messages placed in data mover 452. In other embodiments, different combinations of parser components and/or different parser components not shown may be included in one or more parser 450 to handle data from various data feeds 300 and readers 400 as required.

As different readers 400 and parsers 450 include different components to process data from data feeds 300 having different formats, the processing steps each reader 400 and parser 450 performs may be different. These steps may be specific to each data format. To illustrate an example of such a difference, FIG. 4C provides a comparison between data feed reader 400 processes, and FIG. 4D provides a comparison between data feed parser 450 processes, according to an embodiment of the invention. In FIGS. 4C and 4D, the left columns list processes performed by BATS PITCH reader 400C and parser 450C, respectively. The right columns list processes performed by NASDAQ NLS reader 400A and parser 450A, respectively. Note that the BATS PITCH processing includes more steps than the NASDAQ NLS processing in this example. This is because the BATS PITCH data feed 300C may include only bid and ask data, requiring processing to identify trades, while the NASDAQ NLS data feed 300A may include trade data. For an example of trade data in NASDAQ NLS data feed 300A, see FIG. 4E. FIGS. 4C and 4D are not intended to limit the scope of processing that may be performed by readers 400 and parsers 450, or even the scope of processing performed by the specific BATS PITCH reader 400C and parser 450C and NASDAQ NLS reader 400A and parser 450A. Instead, they present a comparison and a possible set of steps for these specific readers 400 and parsers 450 to illustrate the complexity and importance of customizing readers 400 and parsers 450 to suit their associated data feeds 300.

The following pseudocode is presented to illustrate a possible example processing flow for BATS PITCH reader 400C and BATS PITCH parser 450C. Other readers 400 and parsers 450 may perform different processing, as discussed above. In this example, and in other embodiments, reader 400 and parser 450 may be able to process a substantial volume of data from data feed 300. For example, data feed 300 may produce many thousands of quotes per second, and reader 400 and parser 450 may place formatted messages for each quote in data mover 452 each second. This may enable real-time or near real-time condition detection and notification as discussed below.

Reader Processing
  Read BATS packets from a BATS multicast channel. (xBatsMulticast.Reader\UnitReader.cs)
  Detect excessively large gap at start-up and request packets to fill that gap. (xBatsMulticast.Reader\UnitReader.cs—RequestSpinlmage, ReceiveSpinMessages)
  Detect gaps of missing packets and request packets within those gaps. (xBatsMulticast.Reader\Reader.cs—CheckGaps, RequestGaps)
  Decode binary packets. (xBATSMulticast.Shared\PitchCodec.cs)
  Generate PITCH messages from binary packets. (xBatsMulticast.Shared\Objects\AddOrderMessage.cs)
  Create complete, sequential PITCH messages by eliminating duplicate messages, retrieving missing messages, and correcting out-of-order messages. (Sequenced MessageQueue.cs)
  Add PITCH messages to queue in sequential order. (GenericMessageQueueModule)
  On a separate, asynchronous thread, send PITCH messages to Processor. (SendMessagesToProcessor)
Processor (Parser) Processing
  Store PITCH messages from excessively large gaps at startup. (xBatsMulticast.Processor\Processor.cs—SaveSpinlmage and SaveBatsessages)
  Update statistics and process each message based on message type. (ProcessAddOrderMessage, ProcessOrderExecutedMessage, ProcessModifyOrderMessage, ProcessTradeMessage, etc.)
  Create order book. (xBatsMulticast.Processor\Book.cs—AddOrder, ModifyOrder, ExecuteOrder, etc.)
  Create raw ticks. (xBatsMulticast.Processor\Processor.cs—AddTick)
  Set Open, High, Low, Close as appropriate. (UpdateQuote—ProcessOrderExecutedMessage and ProcessTradeMessage)
  Create 1-second bars from raw ticks. (xBatsMulticast.Processor\Processor.cs—

SummarizedTick.SummarizeSorted<Tick, CacheObjects.XigniteSummarizedTick>)

Create checkpoint periodically to return to in the event of an error processing the feed. (xBatsMulticast.Processor\Processors.cs—CreateCheckPoint; xBatsMulticastProcessor\CheckPoint.cs—SaveCheckPoint))

In the event of an error, re-load the most recent checkpoint. (xBatsMulticast.Processor\Processor.cs—LoadCheckPoint)

GetCheckPointStatistics

GetQuotes

GetOrders

GetRawTicks

Prepare PITCH messages to send to DataMover to route to a cache. (xBatsMulticast.Processor\Processor.cs—CollectUpdateDataForCache)

Data Queuing

Figure 7:
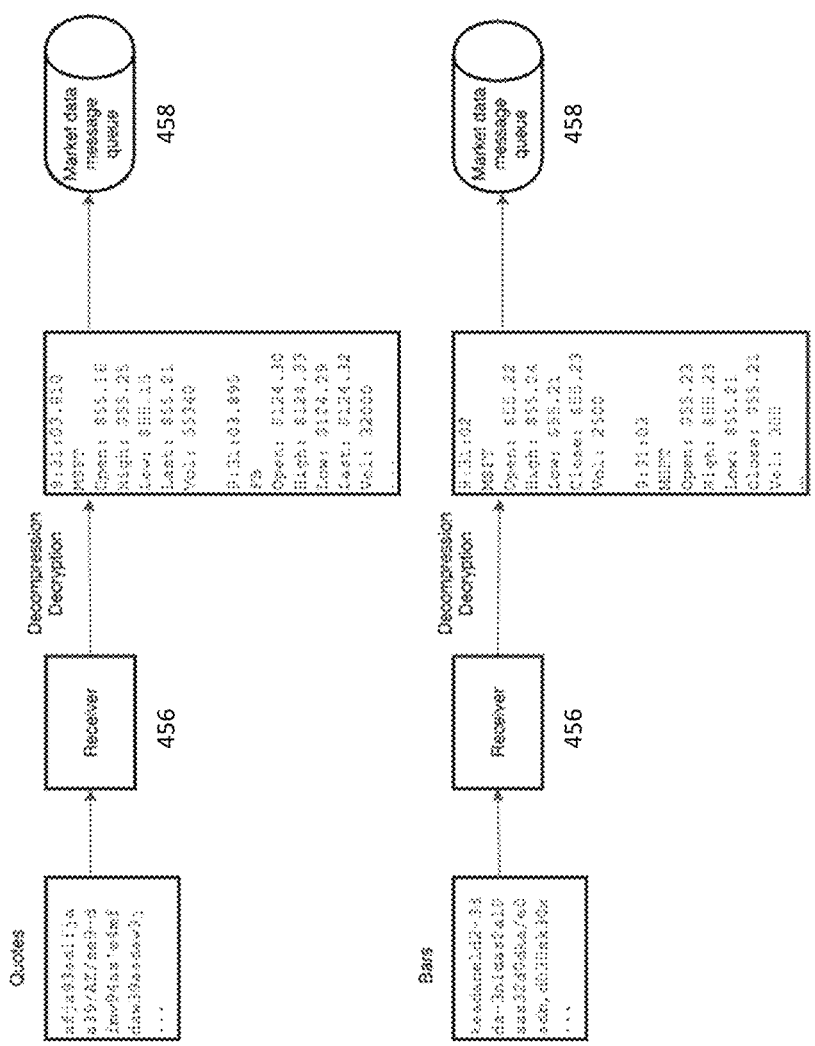
FIG. 7 is a data queue processing system according to an embodiment of the invention.
Figure 8:
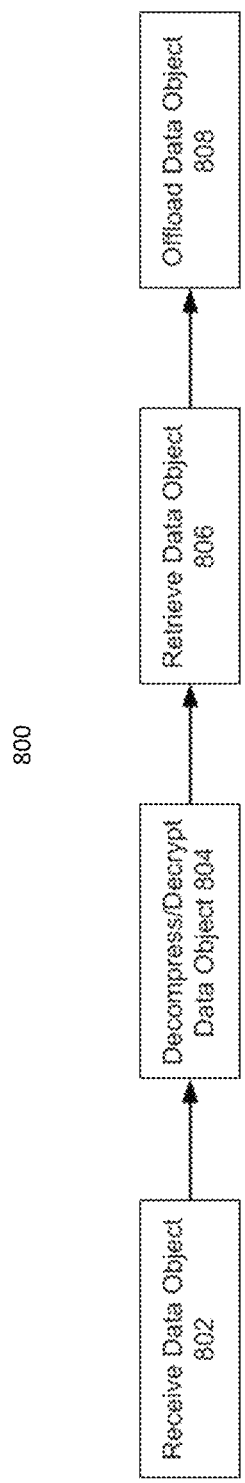
FIG. 8 is a data queuing process according to an embodiment of the invention.

FIG. 7 is a data queue processing system according to an embodiment of the invention, and FIG. 8 is a data queuing process 800 according to an embodiment of the invention. Process 800 is explained in the context of the system of FIG. 7 as follows.

Data may be maintained in a message queue as it arrives in the public cloud infrastructure to ensure that data may be inspected as it arrives. Data may be queued in sequential order as it arrives.

In 802, data mover receiver 456 on the public cloud infrastructure may receive data sent over the internet from physical co-locations via TCP/IP.

In 804, data mover receiver 456 may decompress data objects if compression is enabled in the data mover 452 configuration. Data mover receiver 456 may decrypt data objects if encryption is enabled in the data mover 452 configuration.

In 806, data mover receiver 456 may retrieve data objects.

In 808, data mover receiver 456 may offload the data objects from the senders to a persistent market data message queue 458 to decouple data transmission from data condition evaluation.

Condition Detection

Figure 9A:
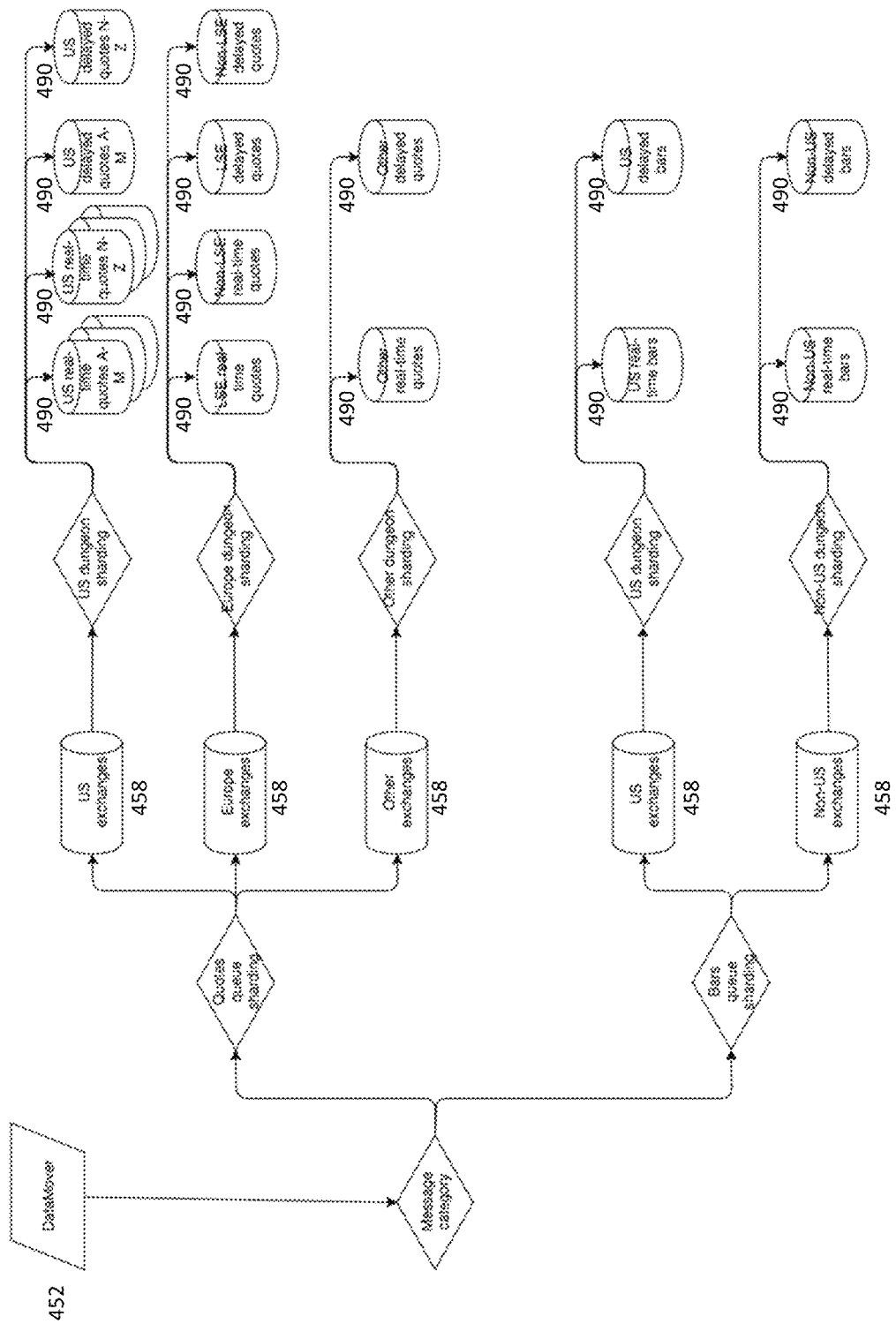
FIG. 9A is a set of data queues according to an embodiment of the invention.

FIG. 9A is a set of data queues 458 according to an embodiment of the invention. A publish-and-subscribe data message queue 458 may maintain the sequential order of data received from data mover 452 senders. The queue 458 may comprise one or more data dungeons 490, each of which may comprise a persistent data repository optimized for high performance when evaluating data conditions. As shown in FIG. 9A, data mover 452 may send data to a plurality of queues 458, each of which may be tailored to a specific subset of data. For example, in FIG. 9A, separate queues 458 for quotes in US, European, and other exchanges and queues 458 for bars in US and non-US exchanges are provided. Within each queue 458, one or more data dungeons 490 may be provided, each storing a subset of the queued data. For example, dungeons 490 may be divided in terms of whether they store real-time or non-real-time data and/or alphabetically. Other divisions of data may be possible. Using a plurality of queues 458 and/or dungeons 490 may provide load balancing and/or redundancy features.

Figure 9B:
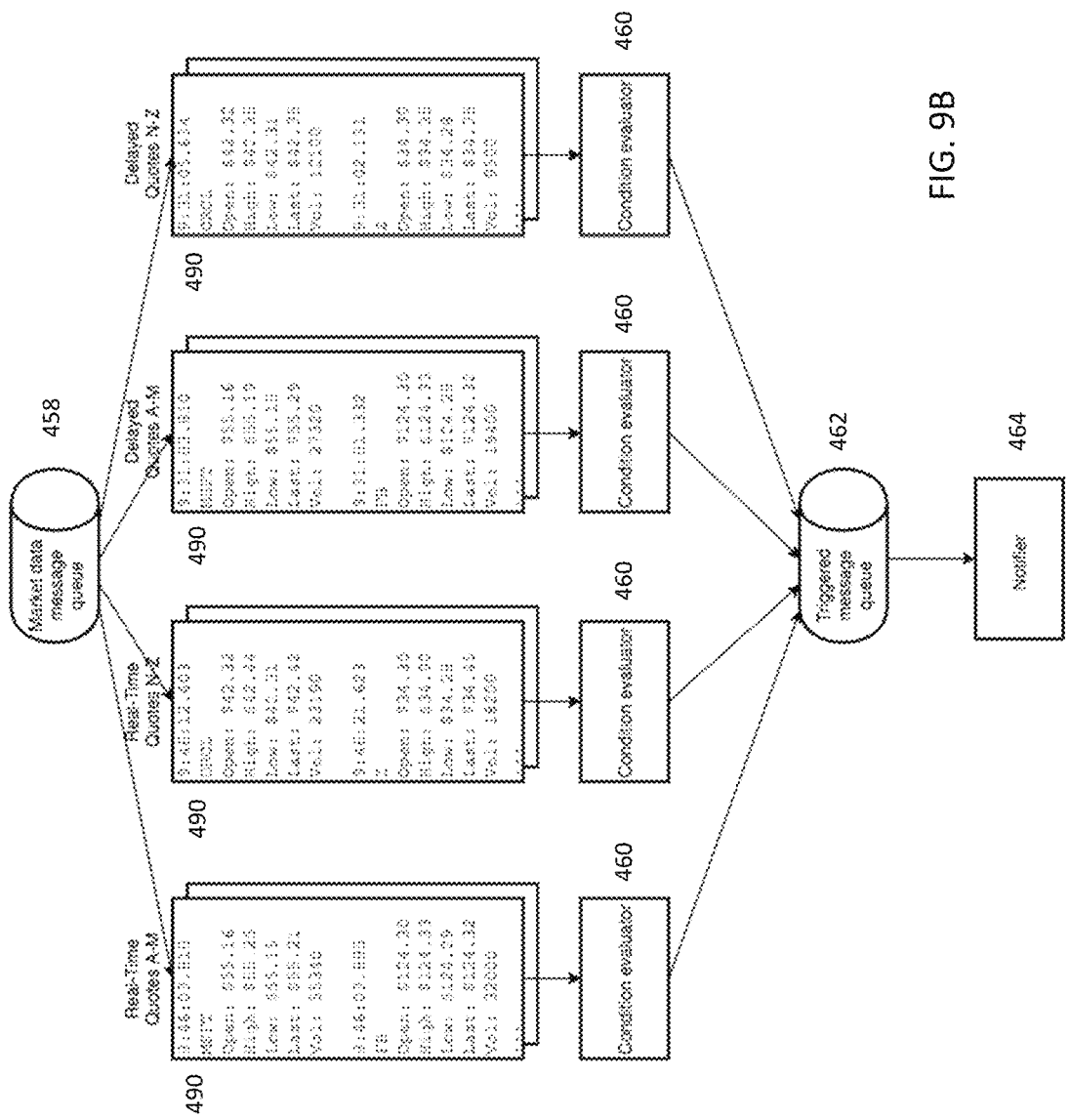
FIG. 9B is a condition detection system according to an embodiment of the invention.
Figure 9C:
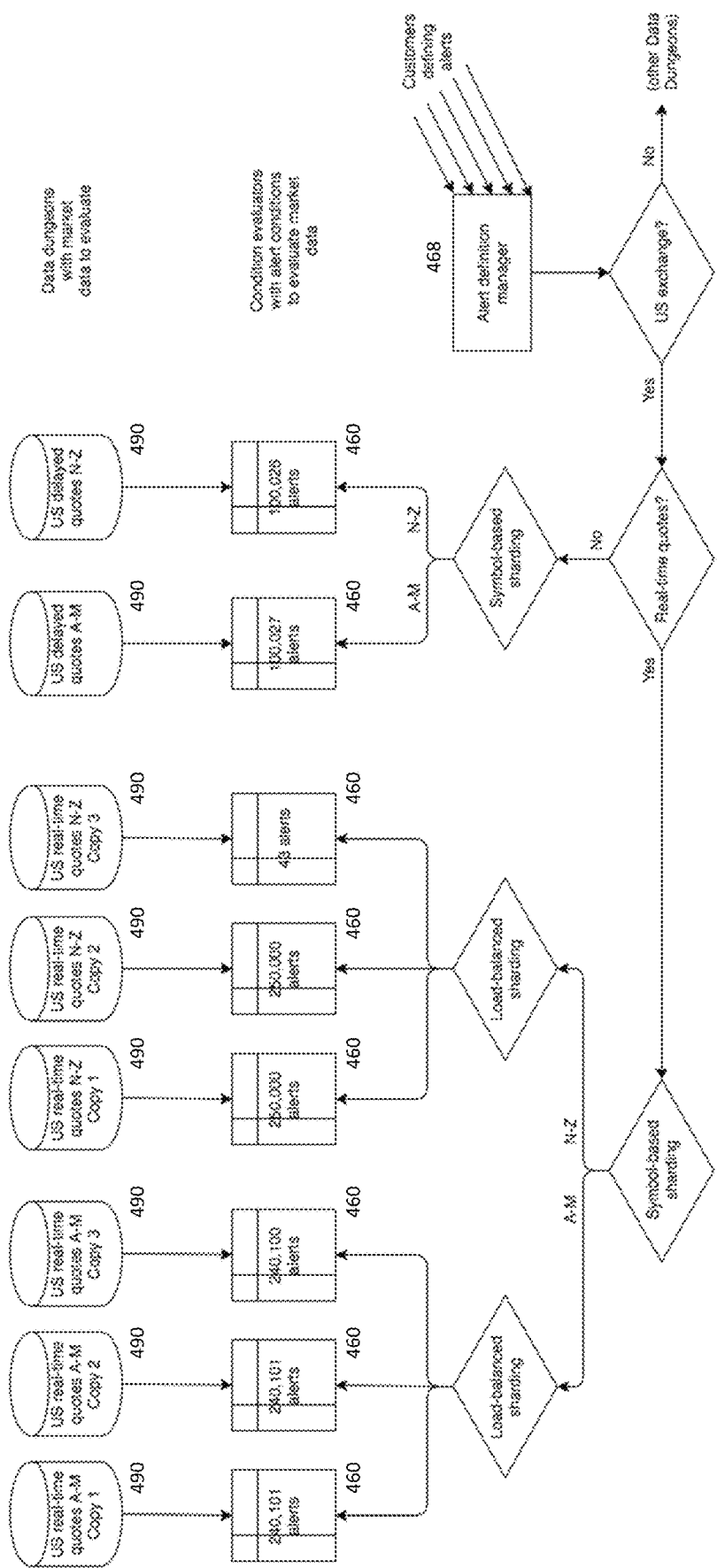
FIG. 9C is a condition detection system according to an embodiment of the invention.
Figure 10:
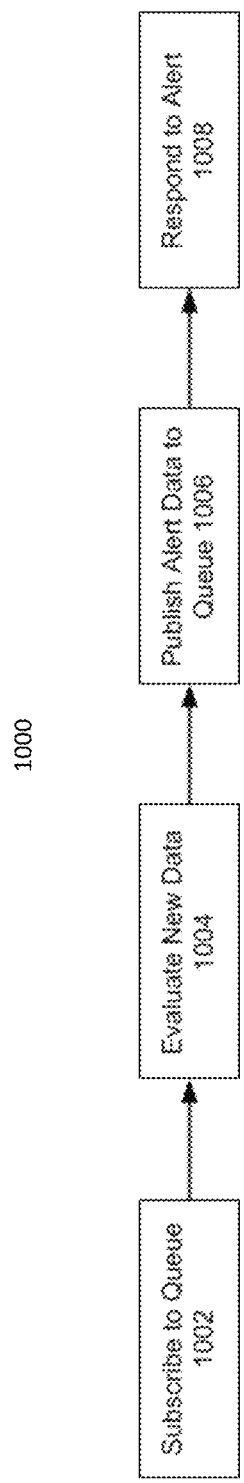
FIG. 10 is a condition detection process according to an embodiment of the invention.

FIG. 9B is a condition detection system according to an embodiment of the invention, and FIG. 10 is a condition detection process 1000 according to an embodiment of the invention. Process 1000 is explained in the context of the system of FIG. 9B as follows. FIG. 9C, discussed below, shows an example condition detection system including load balancing features.

For example, FIG. 9B shows four data dungeons 490, Real-Time Quotes A-M, Real-Time Quotes N-Z, Delayed Quotes A-M, and Delayed Quotes N-Z. Other embodiments may include different data dungeons 490 or different combinations of data dungeons 490.

The publish-and-subscribe architecture for distributing data across multiple data dungeons 490 may enable full redundancy to prevent missing an event due to a technical failure. Data may be partitioned by namespace (for example, by symbol or exchange) for performance and scalability. Data may be partitioned by timeliness (for example, 15-minute delay) to reflect market-driven constraints for data access. Access to real-time market data may require higher exchange fees than access to delayed market data, for example.

Condition evaluators 460 may evaluate whether each market data entry meets any condition that a customer has defined. For each alert definition, condition evaluators 460 may first determine which data dungeon 490 may contain market data that meets the condition, then may continually evaluate new data in that data dungeon 490 to determine whether it meets that condition.

FIG. 9C is a condition detection system according to an embodiment of the invention. The condition detection system of FIG. 9C may function similarly to that of FIG. 9A, but includes load balancing with plural copies of some data dungeons 490. To check an alert condition, definition manager 468 may determine relevant data dungeons 490 based on the API and condition associated with each alert definition, as discussed below. Alert checks may be routed based on whether they are real-time or delayed. In this example, more real-time alert checks are needed than delayed checks. Thus, the system does not maintain multiple copies of the delayed data dungeons 490. However, multiple copies of each real-time data dungeon 490 are maintained for load balancing, each with its own associated condition evaluator 460. Alert checks are sharded to the various condition evaluators 460 to balance the load among the condition evaluators 460. Note that in any given second, each condition evaluator 460 may be evaluating hundreds of thousands of alerts. Accordingly, the described load balancing systems can allow for scaling to handle extremely large processing loads.

Turning to FIG. 10, in 1002, each data dungeon 490 may subscribe to a market data message queue. The subscribing may establish which data goes into each dungeon. For example, Real-Time Quotes A-M may subscribe to real-time quote data for stocks having symbols starting with A-M, Real-Time Quotes N-Z may subscribe to real-time quote data for stocks having symbols starting with N-Z, Delayed Quotes A-M may subscribe to delayed quote data (e.g., data having a time stamp earlier than some threshold, such as 15 minutes) for stocks having symbols starting with A-M, and Delayed Quotes N-Z may subscribe to delayed quote data for stocks having symbols starting with N-Z. Each specific data dungeon 490 may be redundant such that two or more data dungeons 490 may register for the same data. Thus, FIG. 9 may represent eight total data dungeons 490, with each data set having a primary and secondary data dungeon 490.

In 1004, condition evaluator 460 may check new data in a data dungeon 490. For example, condition evaluator 460 may compare new data entering data dungeon 490 to determine whether it satisfies any alert conditions established as described above. For example, if a user has requested an alert when MSFT goes above $45/share, condition evaluator 460 may compare the price of MSFT with the trigger value of $45 as MSFT pricing data becomes available in data dungeon 490.

In 1006, condition evaluator 460 may publish data that meets the condition of an alert to triggered message queue 462. For example, if the Real-Time Quotes N-Z data dungeon 490 receives data indicating that MSFT is trading at $47/share, condition evaluator 460 may publish this data into triggered message queue 462.

In 1008, notifier 464 may subscribe to triggered message queue 462 and invoke the appropriate actions as defined by alerts as they are triggered. For example, if a user specified that stocks are to be sold when MSFT is trading above $45/share, notifier 464 may trigger a sale. If the user requested a notification by email when MSFT is trading above $45/share, notifier 464 may create and send an email to the user.

Definition and Status Management

Figure 11:
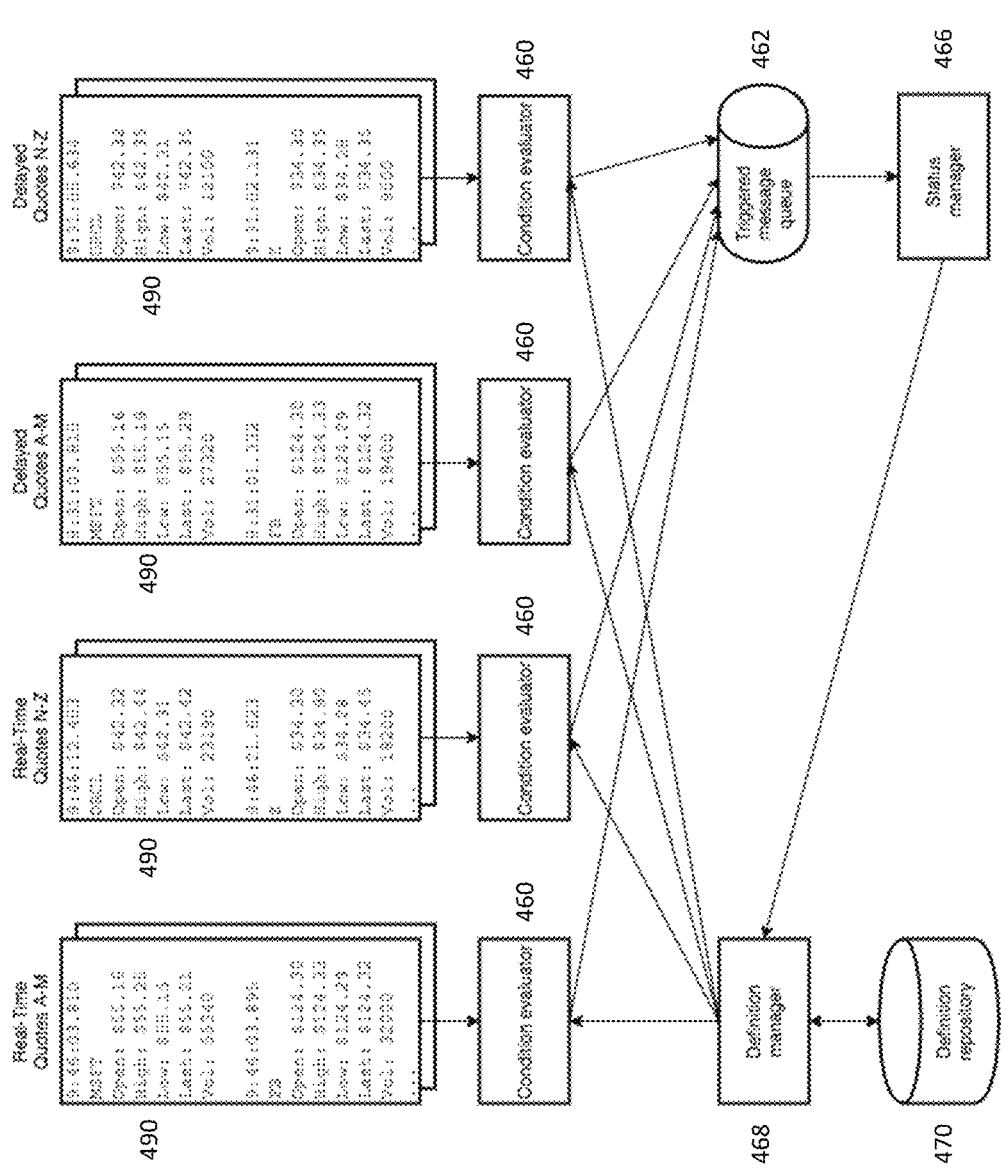
FIG. 11 is a definition and status management system according to an embodiment of the invention.
Figure 12:
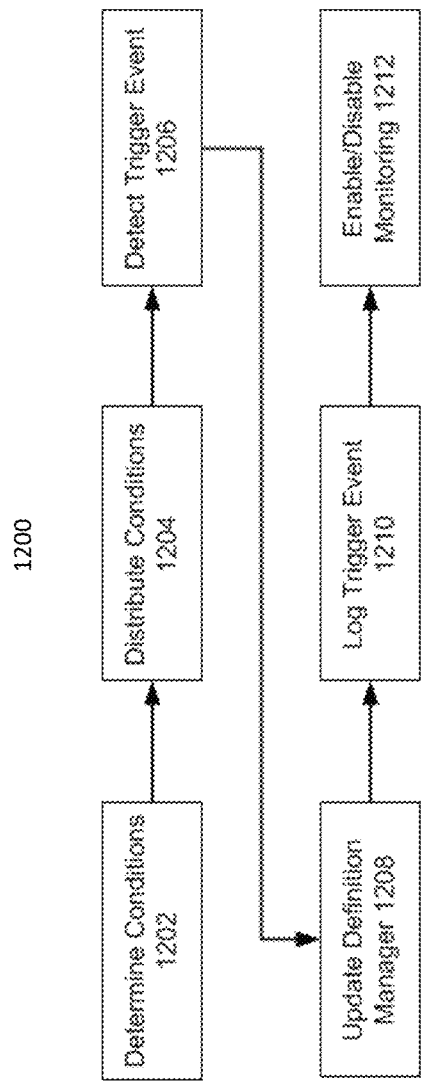
FIG. 12 is a definition and status management process according to an embodiment of the invention.

FIG. 11 is a definition and status management system according to an embodiment of the invention, and FIG. 12 is a definition and status management process 1200 according to an embodiment of the invention. Process 1200 is explained in the context of the system of FIG. 11 as follows.

A database repository 470 may store alert definitions and maintain the current status, for example, the timestamp of each triggered condition and action.

In 1202, definition manager 468 may determine relevant data dungeons 490 based on the API and condition associated with each alert definition. For example, definition manager 468 may can create one data dungeon for real-time NASDAQ data and another data dungeon for 15-minute delayed NSADAQ data. Real-time data may be pushed to the real-time NASDAQ data dungeon, and delayed data may be pushed to the delayed data dungeon. Alerts defined against real-time data may mean that those conditions are tested against the data in the real-time data dungeon. Alerts defined against delayed data may mean that those conditions are tested against the data in the delayed data dungeon.

In 1204, definition manager 468 may distribute the conditions to the appropriate condition evaluator 460. In addition to the real-time vs delayed example with one dungeon for real-time data and another for delayed data, for scalability reasons definition manager 468 may create multiple data dungeons for real-time and/or delayed data. For example, the real-time data may be pushed to multiple real-time data dungeons. Some real-time conditions may be tested against one real-time data dungeon while other conditions may be tested against another real-time data dungeon.

In 1206, status manager 466 may detect a trigger event. Status manager 466 may be another subscriber (in addition to the notifier) to the triggered message queue. A trigger event may be, for example, data in a data dungeon that matches an alert condition. For example, status manager may put the triggered event into the triggered message queue.

In 1208 and for each trigger event, status manager 466 may update definition manager 468 with the triggered event. For each triggered event, definition manager 468 may determine what actions to take based on the alert definition. For example, in response to a stock value reaching a prescribed number, definition manger 468 may cause a user to be alerted by email.

In 1210, definition manager 468 may log the triggered event with the corresponding alert definition and, depending on the alert definition, in 1212, either re-enable or disable the condition evaluator to monitor for the alert condition. An example of an alert that is re-enabled each day may be one that triggers whenever a particular security sets a new 52-week high. An example of an alert that is disabled after triggering may be when a particular security falls to a certain price, for example to trigger a buy order.

FIG. 13 is a set of example alert definitions according to an embodiment of the invention. As the example set shows, alerts may be real-time or delayed. Alerts may be triggered based on a variety of conditions (e.g., change percentage, volume, high, low, etc.) set as described above. Alerts may trigger a variety of actions (e.g., write call, buy put, sell order, email alert, etc.) set as described above. Alerts may be evaluated against different data dungeons 490 and/or even against different copies of data dungeons 490 for load balancing.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
performing processing associated with defining, with a parser module of at least one device comprising at least one processor and at least one memory, a market condition;
performing processing associated with defining, with the parser module, an electronic communication to be taken in response to detecting the market condition;
performing processing associated with receiving, with a reader module of the at least one device, market data;
performing processing associated with detecting, with an evaluator module of the at least one device, the market condition;
accepting an order to make a trade for a trade article in a market based on the market condition; and
accepting a user alert related to the order, the user alert comprising user-specified fields comprising: open, high, low, last, close, volume, 52 week market information, or percent change from previous close, or any combination thereof;
wherein multiple data feed handler servers with Internet network connections are used to support consuming data from multiple switches; and wherein financial market data is evaluated against user-definable conditions during data ingestion and prior to reformatting to human readable format to minimize exception processing latency.

2. The method of claim 1, wherein a source of a data feed and the at least one device comprising the reader module are co-located in a same data center.

3. The method of claim 1, further comprising performing processing associated with converting information in a data feed from a data feed format to a standard format.

4. The method of claim 1, wherein the processing associated with creating at least one object and placing the at least one object in a message queue is performed periodically.

5. The method of claim 1, wherein the at least one device is in a separate geographic location from a source of a data feed.

6. The method of claim 1, wherein the detecting comprises performing processing associated with decrypting and/or decompressing at least one object.

7. A system comprising: at least one device comprising at least one processor and at least one memory, the processor configured to:
performing processing associated with defining, with a parser module, an electronic communication to be taken in response to detecting a market condition;
performing processing associated with receiving, with a reader module of the at least one device, market data;
performing processing associated with detecting, with an evaluator module of the at least one device, the market condition;
accepting an order to make a trade for a trade article in a market based on the market condition; and
accepting a user alert related to the order, the user alert comprising user-specified fields comprising: open, high, low, last, close, volume, 52 week market information, or percent change from previous close, or any combination thereof; and
wherein multiple data feed handler servers with Internet network connections are used to support consuming data from multiple switches; and
wherein financial market data is evaluated against user-definable conditions during data ingestion and prior to reformatting to human readable format to minimize exception processing latency.

8. The system of claim 7, wherein the user alert comprises: a security identifier for a security whose market data is to be monitored; an API containing market data to be monitored; an action to take when a market data condition is met; or when to monitor for a condition; or any combination thereof.

9. The system of claim 7, wherein a user alert is created only against APIs that the user has an entitlement to access.

10. The system of claim 7, wherein a user defines conditions that compare the user-specified field: to a specific value and/or to another field.

11. The system of claim 7, wherein the user defines and specifies a URL for a web service as part of an action definition.

12. The system of claim 7, wherein the electronic communication comprises: an email communication, an SMS communication, or a communication comprising a URL, or any combination thereof.

13. The system of claim 7, wherein the market data comprises exchange trade data and/or exchange quote data from a data feed.

14. The system of claim 7, wherein the at least one processor is further configured for encrypting and/or compressing at least one object.

15. The system of claim 7, wherein the at least one processor is further configured for placing, with the parser module, at least one object in a message queue.

16. The system of claim 7, wherein the at least one processor is further configured for detecting the market condition within a message queue.

17. The system of claim 7, wherein the at least one processor is further configured for taking the electronic communication defined to be taken in response to detecting the market condition.

18. The system of claim 7, wherein additional contextual information regarding a triggered alert is communicated through substitution variables that are embedded within a URL.

19. The system of claim 18, wherein the substitution variable comprises: an alert identifier, an identifier types, an identifier condition, or an alert timestamp, or any combination thereof.

20. A method comprising:
performing processing associated with defining, with a parser module of at least one device comprising at least one processor and at least one memory, a market condition;
performing processing associated with defining, with the parser module, an electronic communication to be taken in response to detecting the market condition;
performing processing associated with receiving, with a reader module of the at least one device, market data;
performing processing associated with detecting, with an evaluator module of the at least one device, the market condition;
accepting an order to make a trade for a trade article in a market based on the market condition; and
accepting a user alert related to the order, the user alert comprising user-specified fields comprising: open, high, low, last, close, volume, 52 week market information, or percent change from previous close, or any combination thereof;
wherein multiple data feed handler servers with Internet network connections are used to support consuming data from multiple switches; and
wherein the user alert comprises: a security identifier for a security whose market data is to be monitored; an API containing market data to be monitored; an action to take when a market data condition is met; or when to monitor for a condition; or any combination thereof.

21. The method of claim 20, wherein a source of a data feed and the at least one device comprising the reader module are co-located in a same data center.

22. The method of claim 20, further comprising performing processing associated with converting information in a data feed from a data feed format to a standard format.

23. The method of claim 20, wherein the processing associated with creating at least one object and placing the at least one object in a message queue is performed periodically.

24. The method of claim 20, wherein the at least one device is in a separate geographic location from a source of a data feed.

25. The method of claim 20, wherein the detecting comprises performing processing associated with decrypting and/or decompressing at least one object.

26. A system comprising: at least one device comprising at least one processor and at least one memory, the processor configured to:
   performing processing associated with defining, with a parser module, an electronic communication to be taken in response to detecting a market condition;
   performing processing associated with receiving, with a reader module of the at least one device, market data;
   performing processing associated with detecting, with an evaluator module of the at least one device, the market condition;
   accepting an order to make a trade for a trade article in a market based on the market condition; and
   accepting a user alert related to the order, the user alert comprising user-specified fields comprising: open, high, low, last, close, volume, 52 week information, or percent change from previous close, or any combination thereof; and
   wherein multiple data feed handler servers with Internet network connections are used to support consuming data from multiple switches; and
   wherein the user alert comprises: a security identifier for a security whose market data is to be monitored; an API containing market data to be monitored; an action to take when a market data condition is met; or when to monitor for a condition; or any combination thereof.

27. The system of claim 26, wherein financial market data is evaluated against user-definable conditions during data ingestion and prior to reformatting to human readable format to minimize exception processing latency.

28. The system of claim 26, wherein a user alert is created only against APIs that the user has an entitlement to access.

29. The system of claim 26, wherein a user defines conditions that compare the user-specified field: to a specific value and/or to another field.

30. The system of claim 26, wherein the user defines and specifies a URL for a web service as part of an action definition.

31. The system of claim 26, wherein the electronic communication comprises: an email communication, an SMS communication, or a communication comprising a URL, or any combination thereof.

32. The system of claim 26, wherein the market data comprises exchange trade data and/or exchange quote data from a data feed.

33. The system of claim 26, wherein the at least one processor is further configured for encrypting and/or compressing at least one object.

34. The system of claim 26, wherein the at least one processor is further configured for placing, with the parser module, at least one object in a message queue.

35. The system of claim 26, wherein the at least one processor is further configured for detecting the market condition within a message queue.

36. The system of claim 26, wherein the at least one processor is further configured for taking the electronic communication defined to be taken in response to detecting the market condition.

37. The system of claim 26, wherein additional contextual information regarding a triggered alert is communicated through substitution variables that are embedded within a URL.

38. The system of claim 37, wherein the substitution variable comprises: an alert identifier, an identifier types, an identifier condition, or an alert timestamp, or any combination thereof.

39. A method comprising:
   performing processing associated with defining, with a parser module of at least one device comprising at least one processor and at least one memory, a market condition;
   performing processing associated with defining, with the parser module, an electronic communication to be taken in response to detecting the market condition;
   performing processing associated with receiving, with a reader module of the at least one device, market data;
   performing processing associated with detecting, with an evaluator module of the at least one device, the market condition;
   accepting an order to make a trade for a trade article in a market based on the market condition; and
   accepting a user alert related to the order, the user alert comprising user-specified fields comprising: open, high, low, last, close, volume, 52 week market information, or percent change from previous close, or any combination thereof;
   wherein multiple data feed handler servers with Internet network connections are used to support consuming data from multiple switches; and
   wherein a user alert is created only against APIs that the user has an entitlement to access.

40. The method of claim 39, wherein a source of a data feed and the at least one device comprising the reader module are co-located in a same data center.

41. The method of claim 39, further comprising performing processing associated with converting information in a data feed from a data feed format to a standard format.

42. The method of claim 39, wherein the processing associated with creating at least one object and placing the at least one object in a message queue is performed periodically.

43. The method of claim 39, wherein the at least one device is in a separate geographic location from a source of a data feed.

44. The method of claim 39, wherein the detecting comprises performing processing associated with decrypting and/or decompressing at least one object.

45. A system comprising: at least one device comprising at least one processor and at least one memory, the processor configured to:
   performing processing associated with defining, with a parser module, an electronic communication to be taken in response to detecting a market condition;
   performing processing associated with receiving, with a reader module of the at least one device, market data;
   performing processing associated with detecting, with an evaluator module of the at least one device, the market condition;
   accepting an order to make a trade for a trade article in a market based on the market condition; and
   accepting a user alert related to the order, the user alert comprising user-specified fields comprising: open, high, low, last, close, volume, 52 week market information, or percent change from previous close, or any combination thereof; and
   wherein multiple data feed handler servers with Internet network connections are used to support consuming data from multiple switches; and
   wherein a user alert is created only against APIs that the user has an entitlement to access.

46. The system of claim 45, wherein financial market data is evaluated against user- definable conditions during data ingestion and prior to reformatting to human readable format to minimize exception processing latency.

47. The system of claim 45, wherein the user alert comprises: a security identifier for a security whose market data is to be monitored; an API containing market data to be monitored; an action to take when a market data condition is met; or when to monitor for a condition; or any combination thereof.

48. The system of claim 45, wherein a user defines conditions that compare the user-specified field: to a specific value and/or to another field.

49. The system of claim 45, wherein the user defines and specifies a URL for a web service as part of an action definition.

50. The system of claim 45, wherein the electronic communication comprises: an email communication, an SMS communication, or a communication comprising a URL, or any combination thereof.

51. The system of claim 45, wherein the market data comprises exchange trade data and/or exchange quote data from a data feed.

52. The system of claim 45, wherein the at least one processor is further configured for encrypting and/or compressing at least one object.

53. The system of claim 45, wherein the at least one processor is further configured for placing, with the parser module, at least one object in a message queue.

54. The system of claim 45, wherein the at least one processor is further configured for detecting the market condition within a message queue.

55. The system of claim 45, wherein the at least one processor is further configured for taking the electronic communication defined to be taken in response to detecting the market condition.

56. The system of claim 45, wherein additional contextual information regarding a triggered alert is communicated through substitution variables that are embedded within a URL.

57. The system of claim 45, wherein the substitution variable comprises: an alert identifier, an identifier types, an identifier condition, or an alert timestamp, or any combination thereof.

* * * * *